United States Patent
Brunner et al.

(10) Patent No.: US 11,002,636 B2
(45) Date of Patent: May 11, 2021

(54) PRESSURE SENSOR WITH A MEMBRANE APPLIED ON A PRESSURE CHAMBER SIDE AND USE THEREOF

(71) Applicant: KISTLER HOLDING AG, Winterthur (CH)

(72) Inventors: Simon Brunner, Effretikon (CH); Martin Giger, Winterthur (CH)

(73) Assignee: Kistler Holding AG, Winterthur (CH)

( * ) Notice: Subject to any disclaimer, the term of this patent is extended or adjusted under 35 U.S.C. 154(b) by 218 days.

(21) Appl. No.: 15/045,857

(22) Filed: Feb. 17, 2016

(65) Prior Publication Data
US 2016/0245721 A1    Aug. 25, 2016

(30) Foreign Application Priority Data
Feb. 20, 2015    (CH) ................................. 00224/15

(51) Int. Cl.
*G01M 15/08* (2006.01)
*G01D 11/24* (2006.01)
(Continued)

(52) U.S. Cl.
CPC .......... *G01M 15/08* (2013.01); *G01D 11/245* (2013.01); *G01L 23/10* (2013.01)

(58) Field of Classification Search
CPC ...... G01M 15/08; G01D 11/245; G01L 23/10; G01L 7/082; G01L 9/0042; G01L 9/0052;
(Continued)

(56) References Cited

U.S. PATENT DOCUMENTS 1,579,536 A * 4/1926 Hodgson ................. G01L 7/082
138/30
4,484,439 A * 11/1984 Singer ....................... F02K 9/92
239/265.27
(Continued)

FOREIGN PATENT DOCUMENTS

EP          649011      *  4/1995
JP       U61115944         7/1986
(Continued)

OTHER PUBLICATIONS

European Search Report, Application No. 16155917.4-1557, dated Apr. 22, 2016, 3 pages.
(Continued)

*Primary Examiner* — Peter J Macchiarolo
*Assistant Examiner* — Anthony W Megna Fuentes
(74) *Attorney, Agent, or Firm* — Dority & Manning, P.A.

(57) ABSTRACT

A pressure sensor for measuring pressures in combustion chambers of internal combustion engines includes a sensor housing with a longitudinal axis and an interior space, a measuring element in the interior space, and a rotation-symmetrically designed membrane with a peripheral edge section connected with an end of the sensor housing at the pressure chamber side to seal off the interior space of the sensor housing on the pressure chamber side. The membrane has a flexible annular membrane segment and a central plunger that interacts with the measuring element and the flexible annular membrane segment. The annular membrane segment connects the plunger with the peripheral edge section. The annular membrane segment is designed as a convex circular arc of constant material thickness on the pressure chamber side.

19 Claims, 3 Drawing Sheets

(51) Int. Cl.
*G01L 7/08* (2006.01)
*G01L 9/06* (2006.01)
*G01L 9/08* (2006.01)
*G01L 23/10* (2006.01)
*G01L 19/04* (2006.01)
*G01L 23/18* (2006.01)

(58) Field of Classification Search
CPC ..... G01L 9/04; G01L 7/08; G01L 9/06; G01L 9/08; G01L 19/04; G01L 23/18
USPC ............................................ 73/715–728, 756
See application file for complete search history.

(56) References Cited

U.S. PATENT DOCUMENTS

| | | | |
|---|---|---|---|
| 4,680,970 A | 7/1987 | Ueda et al. | |
| 5,209,118 A * | 5/1993 | Jerman | G01L 9/0042 |
| | | | 73/715 |
| 5,777,239 A | 7/1998 | Fuglewicz | |
| 2003/0115965 A1* | 6/2003 | Mittelstein | G01L 9/0064 |
| | | | 73/706 |
| 2004/0231425 A1* | 11/2004 | Mizuno | G01L 23/10 |
| | | | 73/715 |
| 2011/0185817 A1* | 8/2011 | Kummer | G01L 23/08 |
| | | | 73/719 |
| 2013/0340532 A1* | 12/2013 | Wohlgemuth | G01L 19/06 |
| | | | 73/716 |

FOREIGN PATENT DOCUMENTS

| | | |
|---|---|---|
| JP | U04021937 | 2/1992 |
| JP | H0534231 | 2/1993 |
| JP | H0534231 A | 2/1993 |
| JP | A07253374 | 10/1995 |
| JP | A1026678 | 1/1998 |
| JP | 2014521961 | 8/2014 |
| WO | WO 2009/021343 | 2/2009 |
| WO | WO2010/040239 A1 | 4/2010 |
| WO | WO 2013/167421 | 11/2013 |

OTHER PUBLICATIONS

JP Office Action, Japanese Patent Application No. 2016-030181, dated May 23, 2019, 8 pages.

* cited by examiner

PRESSURE SENSOR WITH A MEMBRANE APPLIED ON A PRESSURE CHAMBER SIDE AND USE THEREOF

CROSS-REFERENCE TO RELATED APPLICATIONS

This application claims priority to Swiss Application No. 00224/15, filed Feb. 20, 2015.

FIELD OF THE INVENTION

The invention relates to a pressure sensor membrane applied on the pressure chamber side for measuring pressures in pressure chambers, more particularly in combustion chambers of internal combustion engines and a use of such a pressure sensor.

BACKGROUND

Pressure sensors for measuring pressures in pressure chambers, more particularly in combustion chambers of internal combustion engines, typically comprise a hollow cylindrical sensor housing in which a measuring element is located. On the pressure chamber or combustion chamber side the sensor housing is sealed off with a heat-resistant, flexible membrane which separates the combustion chamber from the internal space of the sensor. The membrane directly or indirectly transmits the pressure prevailing in the combustion chamber to the measuring element.

One problem which occurs in the case of all known pressure sensors for combustion chambers or pressure chambers with high and rapid temperature fluctuations is what is known as thermal shock, Thermal expansion and mechanical stresses on the sensor and more particularly in the membrane caused by temperature changes in the pressure chamber can result in measuring errors of varying magnitude, e.g. due to membrane deformation, which arithmetically can only be corrected with difficulty. Known membranes which have been optimised with regard to thermal shock are of a thin-walled, flat design and therefore only have a limited service life. Although a thicker embodiment can increase the service life of the membrane, this results in greater rigidity and therefore deeper sensor sensitivity. At the same time a thicker design of known membranes brings about poorer behaviour of the sensor in terms of thermal shock.

In US20040231425, which by this reference is hereby incorporated herein for all purposes, pressure sensors with different forms of membrane are described. In order to reduce measuring errors due to material expansion it is proposed to provide the membrane between the plunger and the fastening edge with a folded or undulating segment. Upward and downward movements of the plunger due to thermal expansion are intended to be reduced in that the segment has one area facing upwards and one area facing downwards. The material in the case of these membranes is usually of uniform thickness or is at a maximum centrally in the area of the plunger.

From WO2010040239 a membrane for pressure sensors is known which comprises an outer edge and an inner plunger. The outer edge and the inner plunger are connected by means of an elastic segment. Similarly to US20040231425, the elastic segment has an area facing upwards and an area facing downwards. In order to reduce measuring errors as a result of thermal expansion it was further proposed to vary the material thickness of the elastic segment in such a way that it has the thinnest point in the middle, from which the material thickness steadily increases on both sides. This results in a flexible membrane which can better compensate for the thermal expansion. However, a drawback is that with an increasingly thin membrane its strength and thereby its service life decrease.

BRIEF SUMMARY OF THE INVENTION

The aim of the invention is to optimise the measuring accuracy/thermal shock behaviour and the service life of a pressure sensor during the high degree of stressing in the pressure chamber with large pressure and temperature fluctuations.

This aim is achieved by means of a pressure sensor with the features as described below. The pressure sensor for measuring pressures in pressure chambers, more particularly in combustion chambers of internal combustion engines, comprises a sensor housing with a longitudinal axis and an internal space, a measuring element which is arranged in the internal space of the sensor housing, and a rotation-symmetrically designed membrane. The membrane has a peripheral edge section, by way of which it is connected, more particularly welded, to an end of the sensor housing on the pressure chamber side and seals the interior of the sensor housing on the pressure chamber side. The membrane also comprises a central plunger interacting with the measuring element, and a flexible, annular membrane segment. The annular membrane segment connects the plunger to the peripheral edge section of the membrane. In cross-section the annular membrane segment is designed as a convex circular arc of constant material thickness on the pressure chamber side. The convex circular membrane can resist outer pressure much better than a membrane of a different geometry since the pressure sustains the solidity of the arc structure. Were the arc to be concave this advantage would be missing.

On the pressure chamber side, a radial inner end point of the uniformly thick circular arc is, compared to an outer end point of the circular arc, preferably arranged set back along the longitudinal axis in the direction of the inner space Thus, a prolongation of the circular arc is possible without the foremost front of the circular arc protruding further out, in the axial direction of A, than the rim area of the membrane.

In reality, due to the rotational symmetry, the end points both lie on circular lines.

A membrane with a flexible membrane segment designed as a uniformly thick circular arc allows for better force distribution than membranes with straight sections. The even force distribution in the circular arc reduces stresses within the membrane which in turn has a positive effect on the strength of the membrane and thereby its service life. As the radial inner end point of the circular end point and thus the pressure chamber-side surface of the plunger is set back, the circular arc can be formed over a greater angle (midpoint angle), which further increases the effect of the circular arc. Setting back also has the advantage that at a given circular arc angle (midpoint angle) of, for example, 90 degrees and a given radius of the circular arc a smaller outer radius of the membrane is possible, than would be the situation if the inner end point were at the same place as the outer end point. Simulations have shown that with setting back of the inner end point the thermal shock behaviour can also be improved and the measuring error of the measuring element, preferably a piezoelectric or piezoresistant measuring element, can be reduced.

The peripheral edge section of the membrane can preferably project on the pressure chamber side in the direction of the longitudinal axis over a vertex of the circular arc. The vertex is the point of the circular arc which, seen in the longitudinal direction, projects furthest into the pressure chamber. In extreme cases this can coincide with the external end point, wherein, however, as a rule it is located between the two end points, but closer to the outer end point. As the vertex of the circular arc in the longitudinal direction is set back with regard to the surface on the pressure chamber side of the peripheral edge section relative to the pressure chamber, an edge which is elevated with regard to the rest of the membrane is formed. In the assembled state of the pressure sensor the circular arc does not project over the inner wall of the pressure chamber and is thus better protected against the harsh conditions, more particularly in a combustion chamber. The surface of the peripheral edge section can also be at right angles to the longitudinal axis. Simulations have also shown that with a peripheral edge elevated with regard to the circular arc the thermal shock behaviour of the membrane can be optimised.

At the vertex or opposite the vertex the surface of the peripheral edge section can be arranged offset along the longitudinal axis in the direction of the interior space. In these cases the pressure sensor preferably has a sealing cone or protective sleeve which seals the sensor housing off from the combustion chamber wall and on the pressure chamber side projects over the vertex of the circular arc in the direction of the longitudinal axis of the pressure sensor so that in the assembled state the membrane is arranged set back with regard to the wall of the pressure chamber. The sealing cone or the protective sleeve then forms a circumferential edge which is raised vis-á-vis the remainder of the pressure sensor.

On the pressure chamber side at the transition of the annular membrane segment to the peripheral edge section a circumferential recess, for example a U-shaped, trough-shaped or V-shaped recess can be formed, which allows further prolongation of the circular arc, i.e. a greater circular arc angle. Preferably the recess is designed in such a way that between the circular arc and the recess there is an even transition without sharp edges. Towards the pressure chamber side surface of the peripheral edge section the recess can at its radial outer edge form an obtuse angle of 90 to 160 degrees, preferably 120 to 130 degrees. This transition can be in the form of a sharp, rounded or broken edge.

The circular arc can cover an angle (midpoint angle) of 30 to 120 degrees, preferably 55 to 90 degrees. Compared with conventional membranes such membranes exhibit a greater strength under comparable measuring conditions.

On the internal space side in the inner prolongation of the circular arc, the plunger can have an undercut, which leads to an enlargement of the surface acting on the measuring element on the internal space side of the plunger.

In the direction of the longitudinal axis of the membrane, the plunger and/or the peripheral edge section are thicker than the material thickness of the circular arc so that the annular ring segment is the thinnest and therefore most flexible segment.

Possible dimensions and masses of the membrane can be given as follows and can be implemented per se or in any combination with the aforementioned features.

- The circular arc with a constant material thickness encloses an angle of 30 to 120 degrees, preferably 55 to 90 degrees.
- On its radial outer edge the recess forms an obtuse angle of 90 to 160 degrees, preferably 120 to 130 degrees, to a pressure chamber side surface of the peripheral edge section.
- On the internal space side, the tangent at the outer end point of a prolongation of the circular arc encloses an opening angle of 10 to 80 degrees, preferably 30 to 40 degrees, with the longitudinal axis of the sensor housing.
- The ratio of the outer circular arc radius to the outer radius of the membrane is 0.1 to 0.4, preferably around 0.25.

The membrane can, for example, be made of steel, iron-based, nickel-based, cobalt-base or titanium-based alloy which exhibit great strength and temperature resistance.

The invention also relates to the use of a pressure sensor with the features described above for measuring the pressure in a combustion chamber of an internal combustion engine. The pressure sensor can also be used for internal ballistic applications, e.g. in pressure chambers in which rapid and great pressure and temperature changes also occur.

BRIEF DESCRIPTION OF THE DRAWINGS

The invention will be described below with the aid of exemplary embodiments in connection with the drawing. Here.

DESCRIPTION OF EXEMPLARY
EMBODIMENTS OF THE INVENTION

Figure 1:
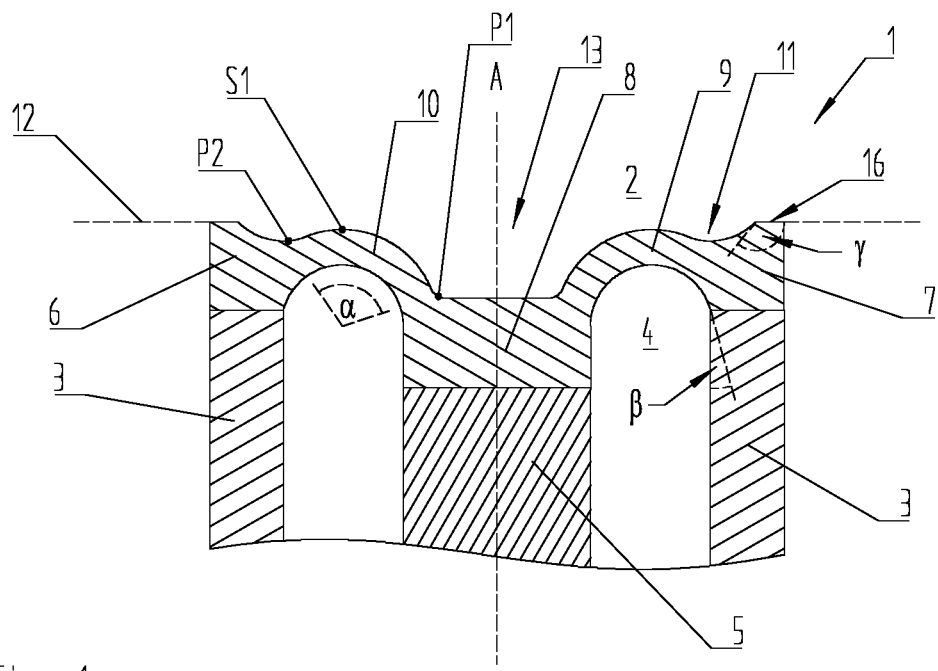
FIG. 1 shows a cross-section of a first form of embodiment of the membrane of a pressure sensor in accordance with the invention.
Figure 2:
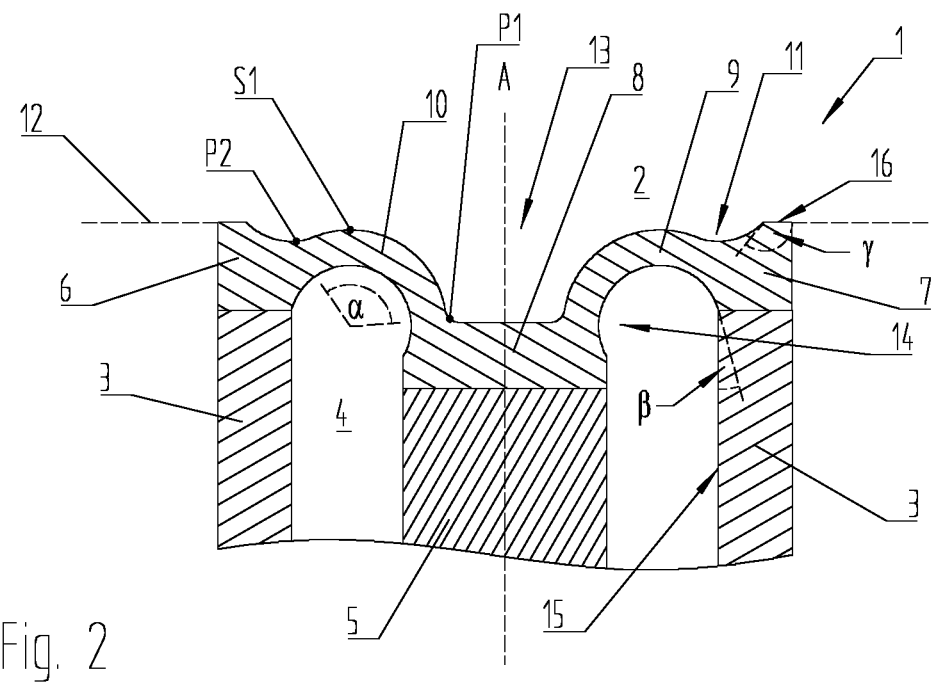
FIG. 2 shows a cross-section of a second form of embodiment of the membrane of a pressure sensor in accordance with the invention.

In FIGS. 1 and 2 cross-sections of different forms of embodiments of a membrane 6 of a pressure sensor 1 for measuring pressures in pressure chambers, more particularly combustion chambers of internal combustion engines, are shown. The pressure sensor 1 comprises a hollow cylindrical sensor housing 3 with an internal space 4 and a measuring element 5, preferably a piezoelectrical or piezoresistant measuring element, arranged in the internal space 4. The sensor housing 3 and measuring element 5 are only partially shown. The other elements of the pressure sensor, such as the electrical connections or the supporting of the measuring element on the sensor housing are conventional and thus need not be shown. The pressure sensor 1 is, for example, screwed or otherwise attached in a sealed manner in a suitable opening in the engine block. In the figures the inner wall 12 of the pressure chamber 2 is indicated by the broken line in the area of membrane 6.

The rotation-symmetrical membrane 6 has a peripheral edge section 7, a central plunger 8 and flexible, annular membrane segment 9. With the peripheral edge section 7 it is firmly welded to an upper edge of the hollow cylindrical sensor housing 3 and seals the internal space 4 of the sensor housing 3 off from the pressure chamber 2. In the shown forms of exemplary embodiments, the membrane and sensor housing are connected edge to edge. Other connections, e.g. with a circumferential seam, are also possible. The flexible, annular membrane segment 9 connects the peripheral edge section 7 with the central plunger 8. The central plunger 8 is interactively connected to the measuring element 5, so that deflections of the plunger 8 along the longitudinal axis A of the pressure sensor 1 occurring as a result of the internal pressure in the pressure chamber 2 can be recorded by the measuring element 5.

Figure 3:
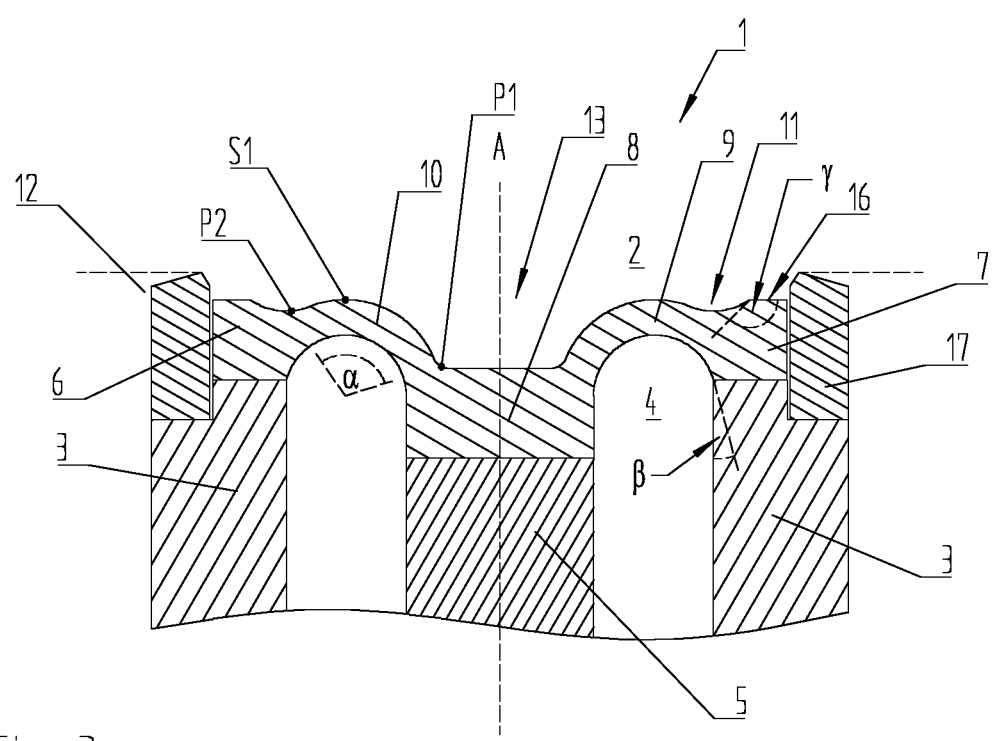
FIG. 3 shows a cross-section of a third form of embodiment of the membrane of a pressure sensor in accordance with the invention.
Figure 4:
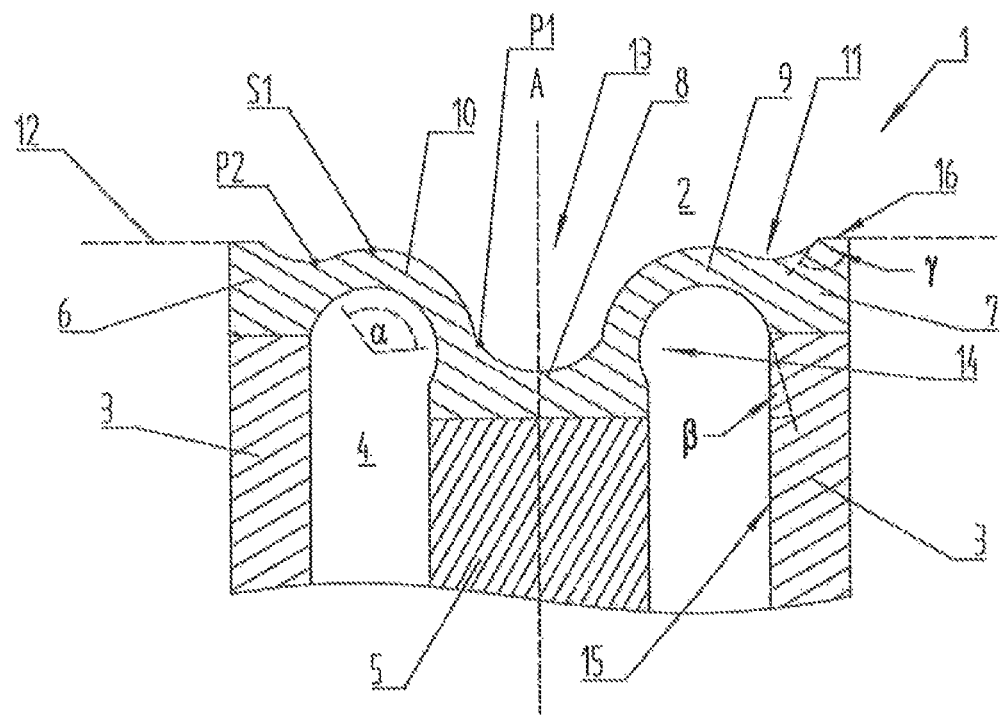
FIG. 4 shows a cross-section of another embodiment of the membrane of a pressure sensor in accordance with the invention.

In cross-section the annular membrane segment 9 is designed as a convex circular arc 10 on the pressure chamber side which comprises a vertex point S1 as being the highest point in axial direction A. The circular arc 10 has a constant material thickness and is thinner than the peripheral edge section 7 or the central plunger 8. As shown in FIGS. 1-3 for example, a central trough 13 with an essentially flat base is formed above the plunger 8. However, as shown in FIG. 4 for example, the base of the central trough 13 can be rounded. In each case, the central trough 13 is delimited by the circular arc 10. At the point where the circular arc 10 is in contact with the base of the central trough 13 it has a radial inner end point P1 on the pressure chamber side. At the connection point with the peripheral edge section 7 it has a radial outer end point P2, wherein the inner end point P1 is arranged offset with regard to the outer end point P2 along the longitudinal axis A in the direction of the internal space 4. The vertex point S1 of the circular arc 10 is preferably arranged lower than the pressure chamber side surface 16 of the peripheral edge section 7. The internal space side surface 16 of the peripheral edge section 7 preferably projects over the circular arc 10 so that in the assembled state of the pressure sensor 1 this surface 16 is essentially flush with the wall 12 of the pressure chamber 2, and the circular arc 10 does not project into the pressure chamber 2. The peripheral edge section 7 forms a circumferential edge that is thus raised with regard to the rest of the membrane 6.

From FIGS. 1 and 2 it can be seen that with a constant radius of the circular arc the angle α (midpoint angle alpha) enclosed by the circular arc 10 can be enlarged in that the inner end point P1 or the base of the trough 13 is moved further downwards. In FIG. 1 the circular arc angle is around 105 degrees and in FIG. 2 around 120 degrees. The angle α of the circular arc 10 can also be enlarged through the design of the depth of a circumferential recess 11 which on the pressure chamber side is formed on the side of the peripheral edge section 7 directed radially inwards. As a rule the lowest point of the recess 11 essentially corresponds with the outer end point P2 of the circular arc 10.

In the exemplary embodiments depicted herein, the recess 11 at its radial outer edge forms an obtuse angle γ of preferably around 135 degrees to the pressure chamber side surface 16 of the peripheral edge section 7. A sharp edge is formed at the transition. On the internal space side the tangent at the end point of the prolongation of the circular arc 10 or at the transition of the annular membrane segment 9 to the peripheral edge section 7 encloses an opening angle β of around 30 degrees with the longitudinal axis A of the cylindrical sensor housing or the inner wall 15 of the cylindrical sensor housing 3, which in the shown embodiment runs in parallel with longitudinal axis A.

In the form of embodiment according to the invention in FIG. 2, the plunger 8 has an undercut 14 on the internal space side in the inner prolongation of the circular arc 10 which brings about an enlargement of the surface area of the plunger 8 acting on the measuring element 5 on the internal space side.

In contrast to the forms of embodiment in FIGS. 1 and 2, the membrane 6 in the form of embodiment in FIG. 3 has a surface 16 of the edge section 7 which is approximately at the vertex S1. Along the longitudinal axis A this surface 16 can also be offset further in the direction of the internal space 4 and in height arranged between the vertex point S1 and the outer end point P2. In such forms of embodiment, the pressure sensor 1 has a sealing cone or protective sleeve 17 which projects above the vertex point S1 in the direction of the longitudinal axis A on the pressure chamber side, so that the membrane is arranged set back with regard to the wall 12 of the pressure chamber 2.

LIST OF REFERENCE NUMERALS

1 Pressure sensor
2 Pressure chamber
3 Sensor housing
4 Interior space
5 Measuring element
6 Membrane
7 Peripheral edge section
8 Plunger
9 Annular membrane segment
10 Circular arc
11 Recess
12 Wall of the pressure chamber
13 Central trough
14 Undercut
15 Inner wall
16 Surface of the edge section
17 Sealing cone/protective sleeve
A Longitudinal axis
P1 Radial inner end point of the circular arc
P2 Radial outer end point of the circular arc
S1 Vertex of the circular arc

The invention claimed is:

1. A pressure sensor that has a pressure chamber side for being exposed to a pressure chamber for measuring pressures in the pressure chamber, the pressure sensor comprising:

a sensor housing defining an end on the pressure chamber side of the sensor, the sensor housing defining an interior space having an opening at the pressure chamber side of the sensor, the sensor housing having a virtual longitudinal axis disposed extending in an axial direction symmetrically through said interior space;

a measuring element arranged in the interior space of the sensor housing and including a piezoelectrical element or a piezoresistive element;

a membrane shaped symmetrically with respect to the virtual longitudinal axis and having a peripheral edge section that connects the membrane with the end of the sensor housing and seals off the opening of the interior space of the sensor housing, the membrane defining a pressure chamber side facing away from the interior space and an interior side facing toward the interior space;

wherein the interior side of the membrane includes a central plunger having a portion maintaining mechanical contact with the measuring element in the interior space;

wherein the membrane includes a flexible, annular membrane segment which connects the plunger to the peripheral edge section, wherein the cross-section taken through the annular membrane segment by a plane that includes the virtual longitudinal axis has a convex circular arc of constant material thickness, the central plunger being thicker measured along the virtual longitudinal axis than the thickness of the annular membrane segment; and wherein the membrane is made of metal and the metal comprises steel, nickel-based alloy, iron-based alloy, cobalt-based alloy, or titanium-based alloy.

2. The pressure sensor according to claim 1, wherein on the pressure chamber side of the membrane there is a radial inner end point of the circular arc and a radial outer end point of the circular arc, wherein the radial distance between the virtual longitudinal axis and the radial inner end point of the circular arc is less than the radial distance between the virtual longitudinal axis and the radial outer end point of the circular arc, wherein the radial inner end point of the circular arc is disposed set back in the axial direction closer to the interior space as compared to the disposition of the radial outer end point of the circular arc.

3. The pressure sensor according to claim 1, wherein the circular arc of the peripheral edge section defines on the pressure chamber side of the membrane, a vertex of that projects away from interior space in the axial direction.

4. The pressure sensor according to claim 3, wherein the circular arc encloses an angle of 30 to 120 degrees.

5. The pressure sensor according to claim 4, wherein the circular arc encloses an angle of 55 to 90 degrees.

6. The pressure sensor according to claim 1, wherein on the pressure chamber side of the membrane, a circumferential recess is formed at the transition of the annular membrane segment to the peripheral edge section.

7. The pressure sensor according to claim 6, wherein at its radial outer edge the recess forms an obtuse angle of 90 to 160 degrees to the pressure chamber side surface of the peripheral edge section.

8. The pressure sensor according to claim 7, wherein the obtuse angle is 120 to 130 degrees.

9. The pressure sensor according to claim 1, wherein in the interior space the tangent at the outer end point of the prolongation of the circular arc forms an opening angle of 10 to 80 degrees with the virtual longitudinal axis of the sensor housing.

10. The pressure sensor according to claim 9, wherein the opening angle is 30 to 40 degrees.

11. The pressure sensor according to claim 1, wherein in the interior space the plunger has an undercut in the inner prolongation of the circular arc.

12. The pressure sensor according to claim 1, wherein in the direction of the virtual longitudinal axis of the membrane the plunger is thicker than the material thickness of the circular arc.

13. The pressure sensor according to claim 1, wherein in the direction of the virtual longitudinal axis of the membrane the peripheral edge section is thicker than the material thickness of the circular arc.

14. The pressure sensor according to claim 1, wherein in the direction of the virtual longitudinal axis of the membrane, each of the plunger and the peripheral edge section is thicker than the material thickness of the circular arc.

15. The pressure sensor according to claim 1, wherein delimited by the annular membrane segment on the pressure chamber side of the membrane there is disposed centrally above the plunger, a central trough formed with an essentially flat base.

16. The pressure sensor according to claim 1, wherein delimited by the annular membrane segment on the pressure chamber side of the membrane there is disposed centrally above the plunger, a central trough formed with an essentially rounded base.

17. A method of monitoring pressure within a combustion chamber of a ballistic missile, the method comprising the steps of:

installing within the combustion chamber of the ballistic missile, a pressure sensor according to claim 1 with the membrane exposed to the combustion chamber;

connecting the pressure sensor to a monitoring device; and using the monitoring device to receive from the pressure sensor, signals indicative of the pressure at the location of the membrane within the combustion chamber of the ballistic missile.

18. The pressure sensor according to claim 1, wherein the cross-section taken through the annular membrane segment by a plane that includes the virtual longitudinal axis defines a concave circular arc exposed to the interior space.

19. The pressure sensor according to claim 1, wherein the peripheral edge section of the membrane and the sensor housing that connects to the peripheral edge section of the membrane are not formed as a unitary element.

* * * * *